(12) United States Patent
Hanada et al.

(10) Patent No.: US 10,712,911 B2
(45) Date of Patent: Jul. 14, 2020

(54) DISPLAY INPUT DEVICE, IMAGE FORMING DEVICE, AND METHOD FOR CONTROLLING DISPLAY INPUT DEVICE

(71) Applicant: KYOCERA Document Solutions Inc., Osaka (JP)

(72) Inventors: Naoto Hanada, Osaka (JP); Norie Fujimoto, Osaka (JP); Takushi Dandoko, Osaka (JP); Takanori Miyamoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/307,803

(22) PCT Filed: Jun. 19, 2017

(86) PCT No.: PCT/JP2017/022544
§ 371 (c)(1),
(2) Date: Dec. 6, 2018

(87) PCT Pub. No.: WO2018/025527
PCT Pub. Date: Feb. 8, 2018

(65) Prior Publication Data
US 2019/0258361 A1    Aug. 22, 2019

(30) Foreign Application Priority Data
Aug. 5, 2016  (JP) .................................. 2016-154728

(51) Int. Cl.
*G06F 3/0482* (2013.01)
*G06F 3/0481* (2013.01)
*G06F 3/0484* (2013.01)

(52) U.S. Cl.
CPC ........ *G06F 3/0482* (2013.01); *G06F 3/04817* (2013.01); *G06F 3/04842* (2013.01)

(58) Field of Classification Search
CPC ..................................................... G06F 3/0482
See application file for complete search history.

(56) References Cited

U.S. PATENT DOCUMENTS

| | | | |
|---|---|---|---|
| 2012/0050807 A1 | 3/2012 | Noda et al. | 358/1.15 |
| 2016/0153799 A1* | 6/2016 | Kodama | G01C 21/36 701/538 |
| 2018/0246636 A1* | 8/2018 | Horiike | G06F 3/0482 |

FOREIGN PATENT DOCUMENTS

JP    2016-109434 A    6/2016

OTHER PUBLICATIONS

Extended European Search Report dated Feb. 21, 2020, issued by the European Patent Office in corresponding application EP 17836634.0.

* cited by examiner

*Primary Examiner* — Cao H Nguyen
(74) *Attorney, Agent, or Firm* — Stein IP, LLC (57) ABSTRACT

A display input device includes a display panel, a touch panel, and a panel control unit. The panel control unit performs the following control: when display of an item selection screen is started, a normal navigation image for selecting a category is displayed; when a wait time has elapsed since the start of displaying the normal navigation image, a reduced navigation image is displayed in place of the normal navigation image; when an expansion key is operated while reduction display is performed, the normal navigation image is redisplayed; and the normal navigation image is continuously displayed even when the wait time has elapsed since the start of redisplaying the normal navigation image.

10 Claims, 7 Drawing Sheets

DISPLAY INPUT DEVICE, IMAGE FORMING DEVICE, AND METHOD FOR CONTROLLING DISPLAY INPUT DEVICE

CROSS-REFERENCE TO RELATED APPLICATIONS

This application is a national stage of International Application No. PCT/JP2017/022544, filed Jun. 19, 2017, which claims the benefit of priority to Japanese Application No. 2016-154728, filed Aug. 5, 2016, in the Japanese Patent Office, the disclosures of which are incorporated herein in their entireties by reference.

TECHNICAL FIELD

The present invention relates to a display input device and an image forming apparatus (device) that display an operation image, recognize, via a touch panel, an operation with respect to the operation image, and accept an operation performed by a user.

BACKGROUND ART

For example, there is known an electronic device provided with a display panel and a touch panel key. The display panel displays an operation image such as a button. The electronic device recognizes an operation with respect to the operation image. The electronic device performs an operation corresponding to the operation image thus operated. Displaying multiple operation images within a screen might impair viewability of the screen. In some cases, some operation images are intentionally not displayed on a screen for improved viewability of the screen. Patent Document 1 describes one example of an electronic device (a car navigation device) that displays an operation button only when necessary and hides an operation button presumed unnecessary.

Specifically, Patent Document 1 describes an electronic device that displays an operation button when a proximity sensor has detected an approach of an operation member such as a finger or a touch pen toward a display operation portion so that the operation button would not interfere with viewing of videos as compared with a case where the operation button is always displayed (Patent Document 1, paragraphs [0015] and [0016]). Furthermore, in Patent Document 1, there is provided an icon for performing a search that, once used, is expected not to be used again for a prescribed length of time (for example, an icon for performing a search for rest facilities). After being used, this icon is hidden for a given length of time. This is intended to improve viewability by reducing the number of icons displayed (Patent Document 1, paragraphs [0019] and [0020]).

LIST OF CITATIONS

Patent Literature

Patent Document 1: JP-A-2016-109434

SUMMARY OF INVENTION

Technical Problem

A display input device including a display panel and a touch panel may be installed also in an image forming apparatus (device). Examples of an image forming apparatus include a multi-functional peripheral, a printer, a copy machine, and a fax machine. Improvements have been underway in functionality and multifunctionality of an image forming apparatus. The number of sellable items and types of set values have thus been increased. In order to achieve easily understandable display, it is conceivable to automatically hide an image or information expected to be unnecessary.

For example, with regard to a specific image on a setting screen displayed by a display input device, when a given length of time has elapsed since full display of the setting screen, it is assumed that a user has already viewed the setting screen. Then, it is conceivable to simplify the display in part or in entirety.

When wishing to review a full version of an image thus simplified, a user performs an operation of redisplaying the full version of the image. This enables reviewing of a full version of an image automatically simplified. When a given length of time has elapsed, however, the full version of the image that has thus been redisplayed is automatically simplified again. This presents a problem in that, in some cases, although an image has been redisplayed as intended by a user, against his/her intention, the image is automatically simplified.

In the technique described in Patent Document 1, the operation button is displayed only when the touch pen or a finger has approached the display operation portion. The operation button, therefore, may disappear when the finger is released therefrom. If not, multiple icons would be always displayed, causing viewability of videos to be occasionally impaired. For this reason, in some cases, although an image has been displayed as intended by a user, the image thus displayed is automatically hidden. There is no way of solving the above-described problem. Patent Document 1 makes no mention of an operation for redisplaying a search icon that has been hidden for a given length of time since last use thereof.

The present invention has been made to solve the above-described problems with the conventional technique by preventing an image that has been redisplayed as intended by a user from being automatically changed so that such an intension of the user is respected.

Solution to Problem

In order to solve the above-described problems, a display input device according to claim 1 includes a display panel, a touch panel, and a panel control unit. The display panel performs display. The touch panel is provided with respect to the display panel and accepts an operation performed by a user. When a preset start condition is met, the panel control unit controls the display panel to start displaying an item selection screen that is a screen including a first region and a second region. The panel control unit performs control so that an item selection key for selecting an item is displayed in the first region. When starting to display the item selection screen, the panel control unit performs control so that a normal navigation image for selecting a category of the item is displayed in the second region. When a preset wait time has elapsed since the start of displaying the normal navigation image, the panel control unit controls the display panel to perform reduction display in which, in place of the normal navigation image, a reduced navigation image is displayed that is obtained by omitting some contents of the normal navigation image so as to reduce a display area of the reduced navigation image, the reduced navigation image including an expansion key. While the reduction display is performed, upon recognizing, based on an output of the touch panel, that the expansion key has been operated, the panel control unit controls the display panel to redisplay the normal navigation image in the second region. The panel control unit controls the display panel not to perform the reduction display even when the wait time has elapsed since the start of redisplaying the normal navigation image. The panel control unit controls the display panel to continue displaying the normal navigation image.

Advantageous Effects of Invention

According to the present invention, it is possible to provide a display input device that prevents an image that has been redisplayed as intended by a user from being automatically changed. Since an intention of a user is respected, display not intended by the user is not performed. Thus, it is possible to provide a display input device that achieves ease of use and ease of setting.

DESCRIPTION OF EMBODIMENT

With reference to FIG. 1 to FIG. 9, the following describes an embodiment of the present invention. In the following description, an operation panel 1 is used as an example of a display input device. The description further uses a multi-functional peripheral 100 as an example of an image forming apparatus (device) including the display input device. It should be noted, however, that various factors including a configuration, an arrangement, and so on, which are described in this embodiment, do not limit the scope of the invention thereto and are merely illustrative examples.

(Outline of Image Forming Apparatus)

Figure 1:
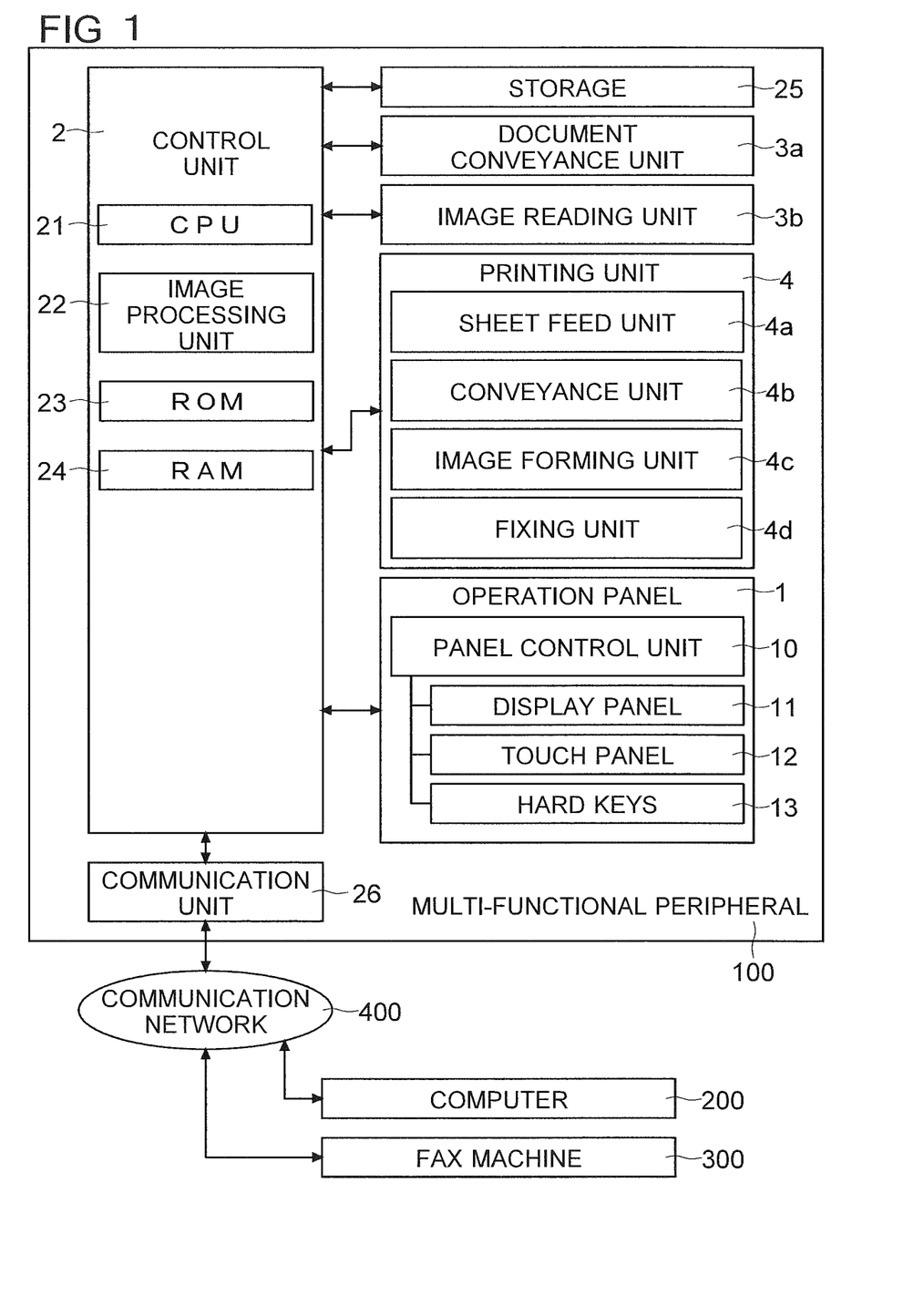
FIG. 1 is a diagram showing one example of a multi-functional peripheral according to an embodiment.

First, with reference to FIG. 1, a description is given of an outline of the multi-functional peripheral 100 according to the embodiment. The multi-functional peripheral 100 includes a control unit 2 therein. The control unit 2 controls various portions of the multi-functional peripheral 100. The control unit 2 includes a CPU 21, an image processing unit 22, a ROM 23, and a RAM 24. The CPU 21 performs various types of computations and processing. The image processing unit 22 performs image processing with respect to image data so as to generate image data to be used for printing or transmission. The multi-functional peripheral 100 includes a storage 25. The storage 25 is a large-capacity storage device such as an HDD. The storage 25 is communicably connected to the control unit 2. The multi-functional peripheral 100 includes non-volatile storage devices (the ROM 23, the storage 25) and a volatile storage device (the RAM 24). Based on programs and control data stored in the ROM 23 and the storage 25, the CPU 21 performs computations and processing so as to control the various portions of the multi-functional peripheral 100.

The multi-functional peripheral 100 includes a document conveyance unit 3a and an image reading unit 3b. The control unit 2 controls the document conveyance unit 3a to sequentially and automatically convey a placed document one by one toward a reading position (a feed reading contact glass, not shown). The control unit 2 controls the image reading unit 3b to read a document conveyed by the document conveyance unit 3a or a document placed on a placement reading contact glass (not shown). The image reading unit 3b generates image data of the document.

A printing unit 4 is provided in the multi-functional peripheral 100. The printing unit 4 includes a sheet feed portion 4a, a conveyance unit 4b, an image forming unit 4c, and a fixing portion 4d. The printing unit 4 performs printing based on a setting made on the operation panel 1 (the display input device). In performing printing, the control unit 2 controls the sheet feed portion 4a to feed a sheet. The control unit 2 controls the conveyance unit 4b to convey the sheet thus fed from the sheet feed portion 4a. The control unit 2 performs control so that, based on image data, the image forming unit 4c forms a toner image. The control unit 2 controls the image forming unit 4c to transfer the toner image on the sheet conveyed thereto. The control unit 2 controls the fixing portion 4d to apply heat and pressure to the sheet on which the toner image has thus been transferred. This causes the toner image to be fixed on the sheet. The sheet on which the toner image has thus been fixed is discharged outside the apparatus.

The control unit 2 is connected to a communication unit 26. The communication unit 26 is a substrate (a network interface card) that communicates with a computer 200 or a fax machine 300 via a communication network 400. The computer 200 is, for example, a personal computer or a server. The communication unit 26 includes a communication connector and a communication control chip. The control unit 2 performs control so that, based on printing data (image data and printing settings) received from the computer 200 by the communication unit 26, the printing unit 4 performs printing (a printer function). Furthermore, the communication unit 26 is capable of transmitting image data to the computer 200 or the fax machine 300 (a transmission function).

(Display Input Device)

Figure 2:
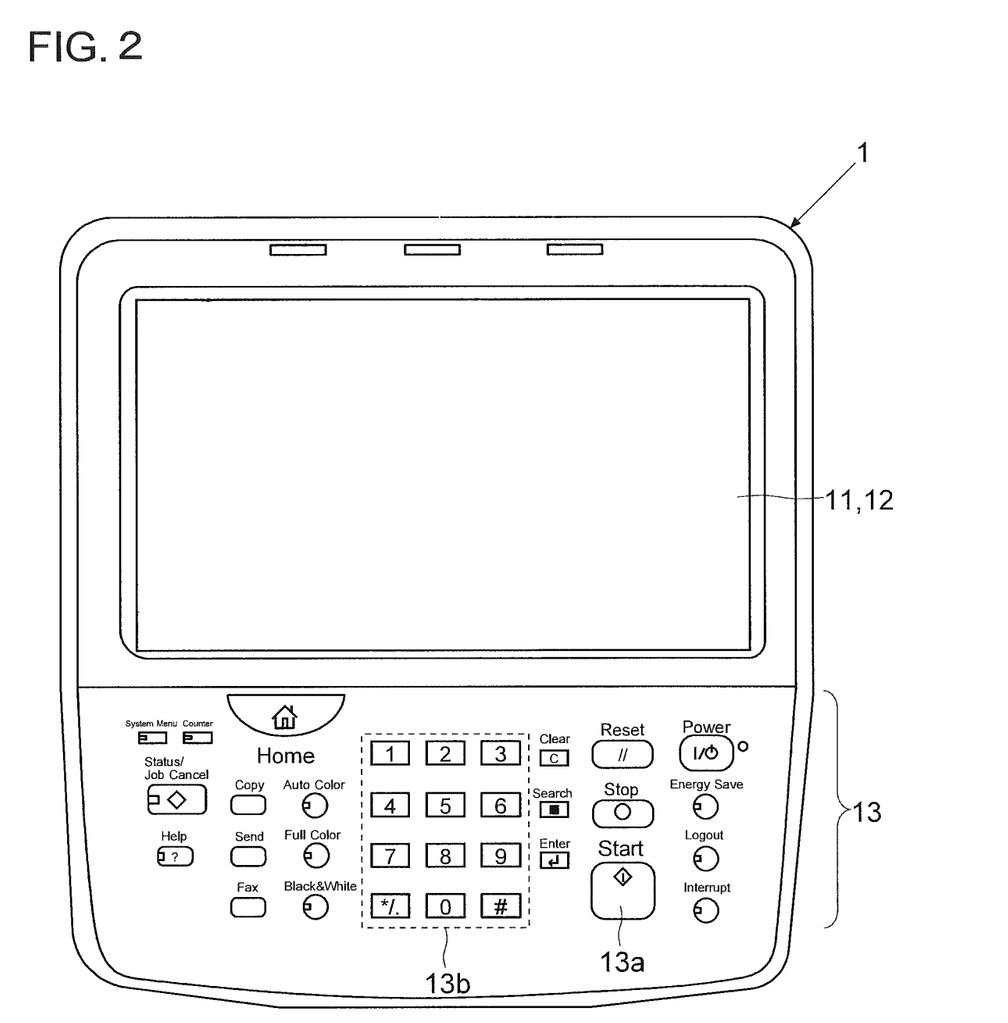
FIG. 2 is a diagram showing one example of an operation panel according to the embodiment.

Next, with reference to FIG. 1 and FIG. 2, a description is given of one example of a display input device according to the embodiment. As shown in FIG. 1, the multi-functional peripheral 100 includes the operation panel 1 as the display input device. The operation panel 1 includes a panel control unit 10, a display panel 11, a touch panel 12, and a plurality of hard keys 13. The display panel 11 displays a setting screen and various messages related to printing or scanning. The touch panel 12 is provided with respect to the display panel 11.

As shown in FIG. 2, the display panel 11 is provided on an upper side on the operation panel 1. The touch panel 12 is provided on an upper surface of the display panel 11. The panel control unit 10 is connected to the display panel 11. The panel control unit 10 controls display on the display panel 11.

The panel control unit 10 is connected to the touch panel 12. Based on an output of the touch panel 12, the panel control unit 10 recognizes a touched position (an operated position) on the display panel 11 (the touch panel 12). The panel control unit 10 recognizes one of operation images displayed on the display panel 11, whose display position has been touched. The operation images include, for example, a soft key, a button, a tab, a check box, and a radio button. The panel control unit 10 thus recognizes contents of an operation performed by a user. The panel control unit 10 controls the display panel 11 to display a screen corresponding to the one of operation images thus operated.

The plurality of hard keys 13 are provided on a lower side on the operation panel 1. The hard keys 13 are connected to the panel control unit 10. For example, a start key 13a and a numeric keypad portion 13b are provided as the hard keys 13. The start key 13a is a key for instructing to start executing a job. The numeric keypad portion 13b is composed of keys for inputting the number of copies to be made, numbers, and numerals. The panel control unit 10 recognizes an operated one(s) of the hard keys 13. The panel control unit 10 recognizes contents of an operation performed by a user via the hard keys 13. Furthermore, the panel control unit 10 controls the display panel 11 to display a screen corresponding to the operated one(s) of the hard keys 13.

The panel control unit 10 notifies the control unit 2 of the contents of the operation performed (contents of a setting made) by the user. In other words, the operation panel 1 accepts a setting operation performed by the user. The setting operation is, for example, an operation of setting a set value related to a job. Based on the notification provided by the operation panel 1, the control unit 2 recognizes the contents of the setting. The control unit 2 controls the printing unit 4 and so on to operate so that a result consistent with the setting is obtained.

In place of the panel control unit 10, the control unit 2 of the multi-functional peripheral 100 may control display on the display panel 11. Furthermore, a configuration may be adopted in which, based on an output of the touch panel 12, the control unit 2 recognizes contents of an operation. Furthermore, the control unit 2 may recognize contents of an operation performed by a user via the hard keys 13. In this case, the panel control unit 10 is not provided, and the display panel 11, the touch panel 12, and the hard keys 13 are electrically connected to the control unit 2.

(Screen Display on Operation Panel 1)

Figure 3:
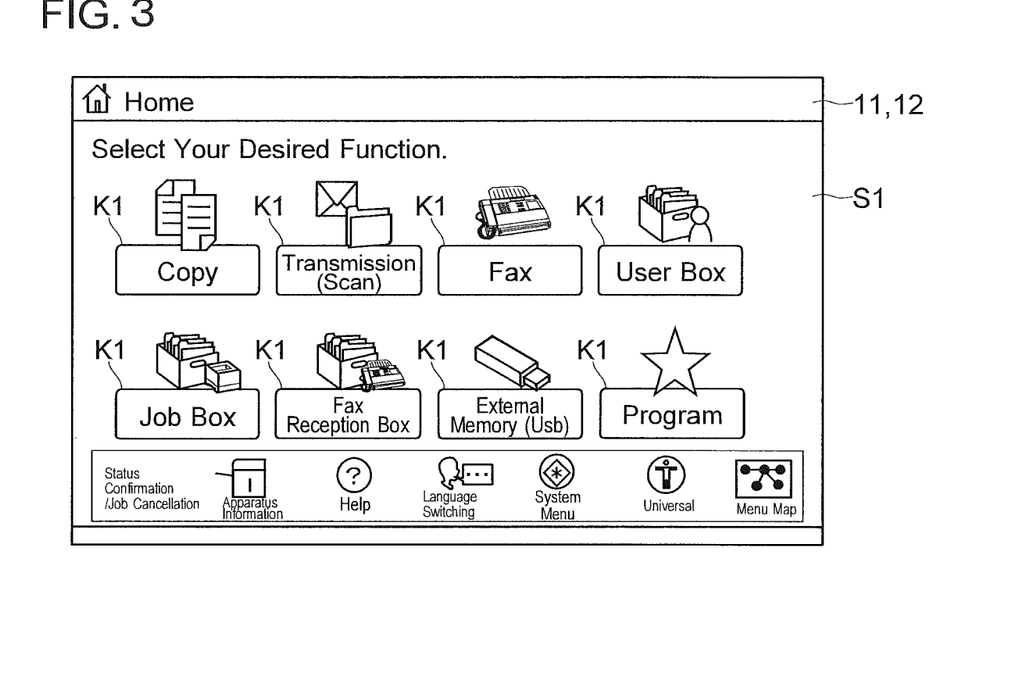
FIG. 3 is a diagram showing one example of a home screen according to the embodiment.

Next, with reference to FIG. 3 to FIG. 6, a description is given of one example of screen display on the operation panel 1 according to the embodiment. A home screen S1 shown in FIG. 3 is a hierarchically top-level screen. When the multi-functional peripheral 100 (the operation panel 1) is started up by switching on main power, the panel control unit 10 controls the display panel 11 to display the home screen S1. Furthermore, when a power saving mode in which the display panel 11 is turned off is released (when a return is made to a normal mode), when a job is completed, or when a preset automatic reset time has elapsed without any further operation performed following a certain operation, the panel control unit 10 controls the display panel 11 to display the home screen S1.

The panel control unit 10 controls the display panel 11 to display a function selection key K1 in the home screen S1. The function selection key K1 is a key for selecting a function (a type of a job to be executed) used in the multi-functional peripheral 100. In an example shown in FIG. 3, the panel control unit 10 controls the display panel 11 to display eight function selection keys K1.

In the multi-functional peripheral 100 (the operation panel 1), functions (jobs) such as a copy function, a scan transmission function, a fax transmission function, and a box storage function are available. The operation panel 1 accepts an operation with respect to any of the function selection keys K1 as an operation of selecting a function (a type of a job). The panel control unit 10 controls the display panel 11 to display an item selection screen S2 for a function selected by operating any of the function selection keys K1.

Figure 4:
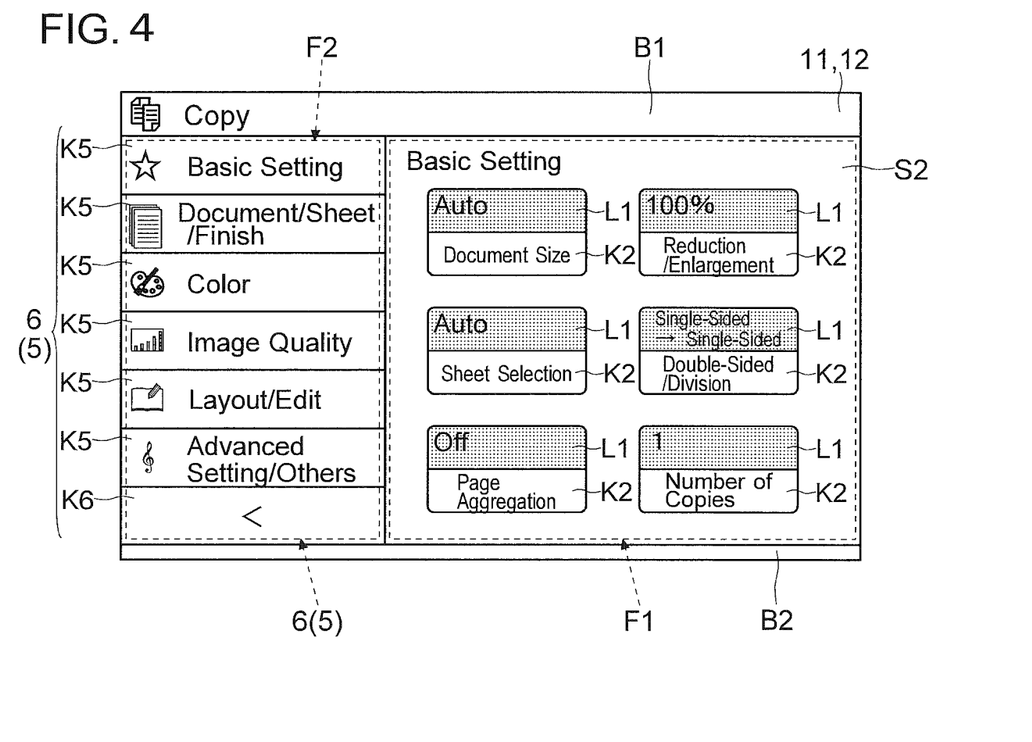
FIG. 4 is a diagram showing one example of an item selection screen related to a copy function according to the embodiment.

FIG. 4 shows one example of the item selection screen S2 for the copy function. The item selection screen S2 for the copy function is displayed when the function selection key K1 for selecting the copy function is operated. The item selection screen S2 for the copy function is hierarchically one level lower than the home screen S1. Item selection screens S2 for functions other than the copy function (for example, the scan transmission, fax transmission, and box storage functions) are also prepared, respectively. Descriptions of the item selection screens S2 for the functions other than the copy function are omitted.

A first region F1 and a second region F2 are provided on the item selection screen S2. The first region F1 and the second region F2 do not overlap each other. In other words, on a screen of the display panel 11, the second region F2 is a region exclusive of the first region F1. The panel control unit 10 controls the display panel 11 to display the first region F1 and the second region F2 on the item selection screen S2 (the same applies to the item selection screens S2 for the other functions).

As shown in FIG. 4, an upper bar B1 is disposed in an uppermost portion of the item selection screen S2. A lower bar B2 is disposed in a lowermost portion of the item selection screen S2. A right-side section of a region exclusive of the upper bar B1 and the lower bar B2 is allocated for the first region F1. A left-side section of the region is allocated for the second region F2. That is, the first region F1 and the second region F2 are arranged in a left-right direction so as to be flush with each other.

The panel control unit 10 performs control so that an item selection key K2 for selecting an item is displayed in the first region F1. The item selection key K2 is a key for selecting an item settable for using a selected function. FIG. 4 shows a state where the item selection keys K2 for selecting, respectively, a plurality of items related to the copy function ("document size," "reduction/enlargement," "sheet selection," "double-sided/division," "page aggregation," "number of copies to be made") are displayed in the first region F1. A set value display field L1 for displaying a current set value is provided on an upper side of each of the item selection keys K2.

The panel control unit 10 performs control so that a navigation image 5 is displayed in the second region F2. The item selection keys K2 displayed in the first region F1 are limited in number. It is impossible to display all the item selection keys K2 in the first region F1. The navigation image 5 is an image for displaying desired ones of the item selection keys K2 in the first region F1. Performing an operation with respect to the navigation image 5 causes switching of displayed ones of the item selection keys K2. The navigation image 5 includes a normal navigation image 6 having a normal size and a reduced navigation image 7.

The reduced navigation image 7 is an image obtained by reducing the normal navigation image 6 (which will be detailed later).

Figure 5:
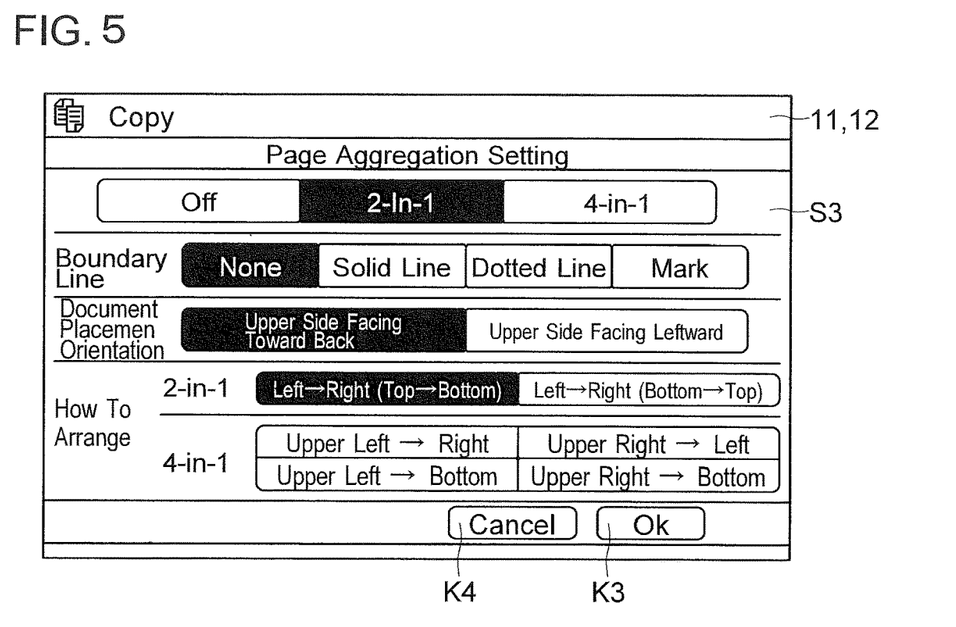
FIG. 5 is a diagram showing one example of a set value setting screen according to the embodiment.

A user can select an item to be set. Specifically, the user operates any of the item selection keys K2 in the first region F1. The panel control unit 10 controls the display panel 11 to display (to switch to) a set value setting screen S3 corresponding to the operated one of the item selection keys K2. FIG. 5 shows one example of the set value setting screen S3. Shown in FIG. 5 is one example of a set value setting screen S3 corresponding to the item of "page aggregation."

On the set value setting screen S3, there are provided soft keys corresponding to various types of set values, respectively. A user can set a set value of an item he/she has selected. Specifically, the user operates any of the soft keys disposed on the set value setting screen S3. FIG. 5 shows a state where, regarding the item of "page aggregation," "2-in-1," "no boundary line," "upper side of document facing upward (an orientation in which a document is placed)," and "left to right (how pages are arranged)" are set as set values. Upon completion of setting the set values, an OK key K3 is operated. Upon cancellation of a setting, a cancel key K4 is operated. When the OK key K3 or the cancel key K4 has been operated, the panel control unit 10 ends display of the set value setting screen S3. A displayed screen then returns to the item selection screen S2.

When starting to display the item selection screen S2, the panel control unit 10 performs control so that the normal navigation image 6 (a non-reduced image) is displayed in the second region F2. The normal navigation image 6 includes a plurality of category selection keys K5 for selecting a category of an item. FIG. 4 shows an example in which, as such a category, categories of "basic setting," "sheet/document/finish," "color," "image quality," "layout/ edit," and "advanced setting/others" are provided. Furthermore, in the normal navigation image 6 shown in FIG. 4, the plurality of category selection keys K5 are arranged (combined) in an up-down direction. The number of categories may be larger or smaller than that in the example shown in FIG. 4. Furthermore, the titles of the categories are each merely one example, and other category titles may also be used.

For each job selected, there are a plurality of settable items (for the copy function alone, there are several tens of such items). Items are each classified in some category. Each item belongs to at least one category. Items that are empirically and statistically known to be set (used) frequently belong to the category of "basic setting". FIG. 4 shows one example of a state where the category of "basic setting" is selected. The items of "document size," "reduction/enlargement," "sheet selection," "double-sided/division," "page aggregation," and "number of copies to be made" are assigned to the category of "basic setting".

When the function selection key K1 for selecting the copy function is operated to start displaying the item selection screen S2 for the copy function, the panel control unit 10 performs control so that the item selection screen S2 for the copy function is initially displayed in a state where the category of "basic setting" is selected. Furthermore, when, upon completion of setting on the set value setting screen S3, the set value setting screen S3 returns to the item selection screen S2, the panel control unit 10 performs control so that a set of item selection keys K2 are displayed in the first region, the set of item selection keys K2 belonging to one of the categories that had been selected before a transition to the set value setting screen S3.

Items related to a sheet, a document, and finishing are assigned to the category of "sheet/document/finish." For example, items of "document size," "sheet size," and "discharge destination" are assigned thereto. Items related to colors used for printing are assigned to the category of "color." Items related to image quality of a printed matter are assigned to the category of "image quality." For example, items of "reading resolution," "printing resolution," and "printing density" are assigned thereto. Items related to page arrangement and processing are assigned to the category of "layout/edit." For example, items of "page aggregation" and "single-sided/double-sided printing" are assigned thereto. Items belonging to none of the above-mentioned categories are assigned to the category of "advanced setting/others." For example, items of "document sequential reading" and "mirror image printing" are assigned thereto.

When selecting a category, a user operates any of the category selection keys K5 included in the normal navigation image 6. Upon recognizing, based on an output of the touch panel 12, that one of the categories has been selected, the panel control unit 10 performs control so that a set of item selection keys K2 corresponding to (assigned to) the one of the categories selected through the operation are displayed in the first region F1. The panel control unit 10 controls the display panel 11 to display the set of item selection keys K2 belonging to the one of the categories selected through the operation.

Figure 6:
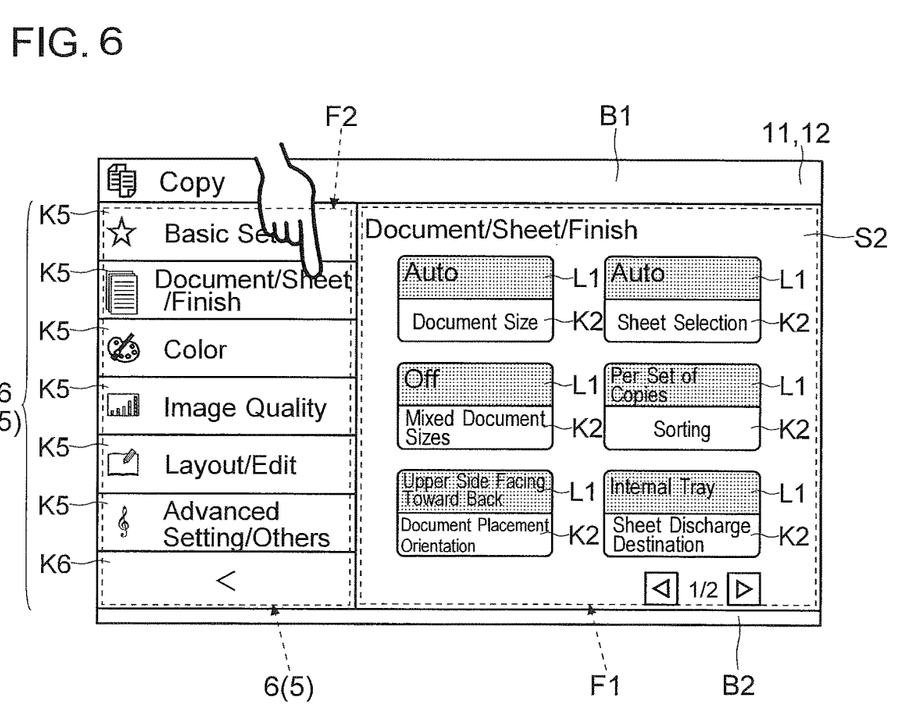
FIG. 6 is a diagram showing one example of switching of item selection keys performed based on a selected category.

FIG. 6 shows one example of the item selection screen S2 displayed when the category selection key K5 for selecting the category of "document/sheet/finish" is operated. Upon recognizing, based on an output of the touch panel 12, that the category of "document/sheet/finish" has been selected, the panel control unit 10 performs control so that a set of item selection keys K2 for selecting, respectively, items belonging to the category of "document/sheet/finish" are displayed in the first region F1. As can be seen by comparing FIG. 4 with FIG. 6, upon a selection of a category, the panel control unit 10 controls the display panel 11 to change a set of item selection keys K2 displayed in the first region F1.

(Reduction Display of Normal Navigation Image 6)

Figure 7:
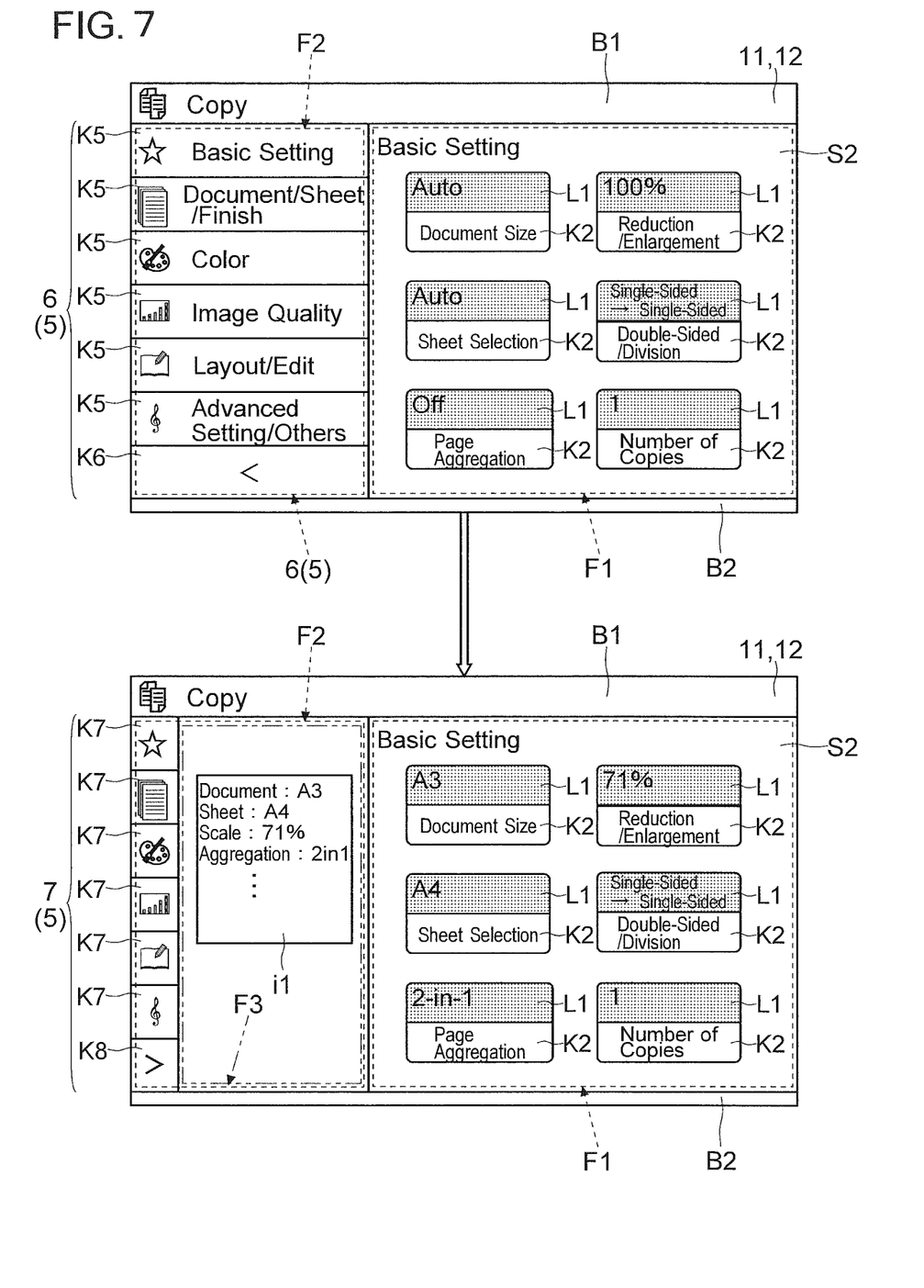
FIG. 7 is a diagram showing one example of a change that occurs in a case where a normal navigation image is reduced to a reduced navigation image according to the embodiment.
Figure 8:
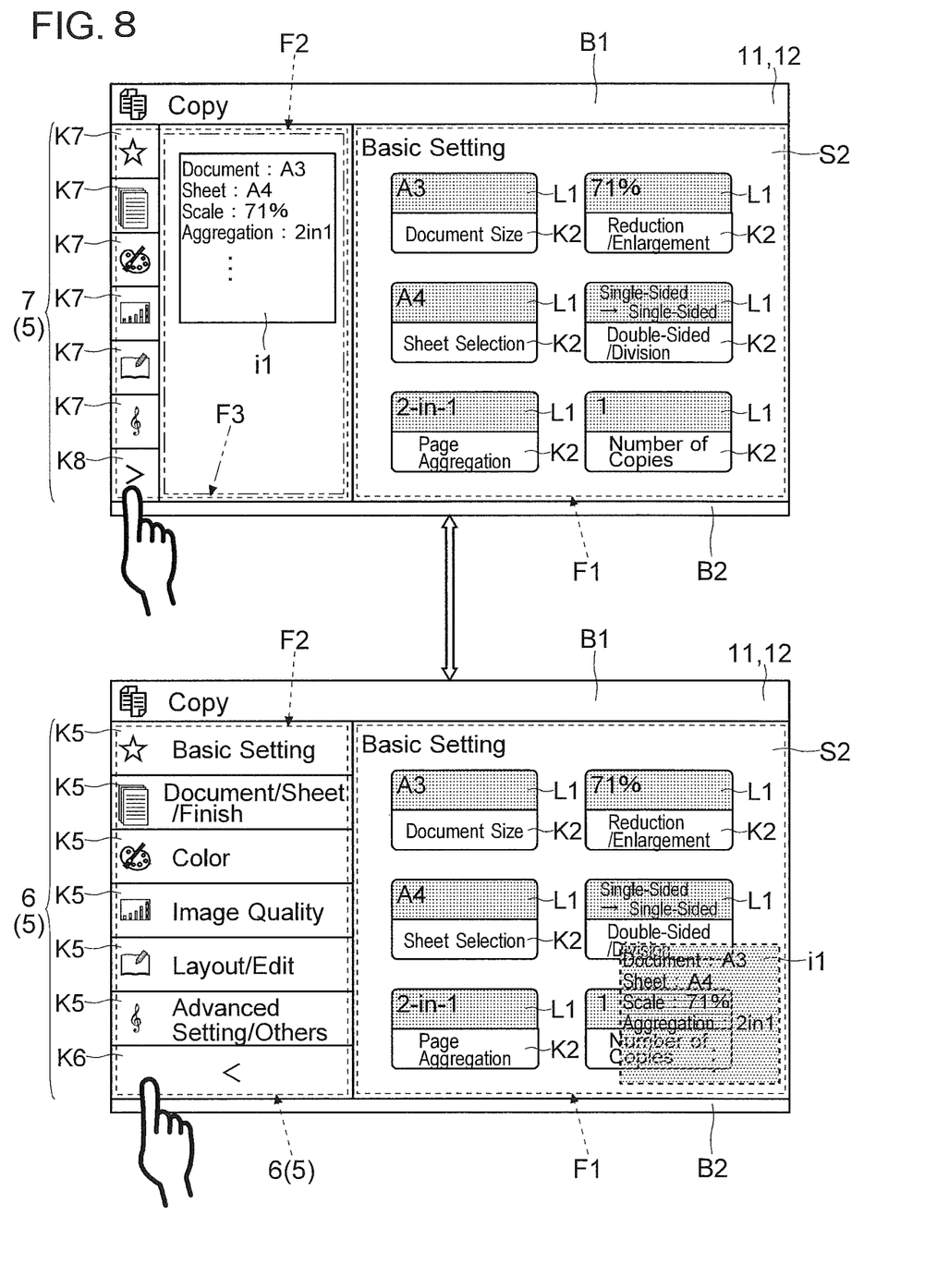
FIG. 8 is a diagram showing one example of a change that occurs in a case where the normal navigation image is redisplayed on an operation panel according to the embodiment.
Figure 9:
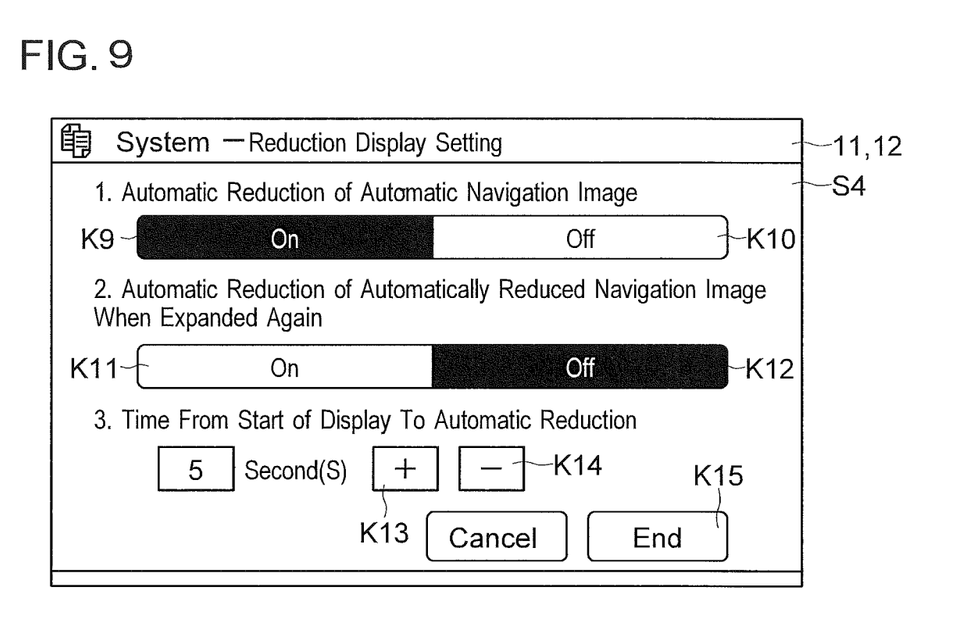
FIG. 9 is a diagram showing one example of a reduction display setting screen according to the embodiment.

Next, with reference to FIG. 7 to FIG. 9, a description is given of one example of reduction display of the normal navigation image 6 performed on the operation panel 1 according to the embodiment.

When a preset start condition is met, the panel control unit 10 controls the display panel 11 to start displaying the item selection screen S2 including the first region F1 and the second region F2. For example, the preset start condition is an operation with respect to any of the function selection keys K1 on the home screen S1.

As shown in FIG. 3, when starting to display the item selection screen S2, the panel control unit 10 performs control so that the normal navigation image 6 is displayed in the second region F2. The normal navigation image 6 is in a non-reduced size (in a normal size). The normal navigation image 6 can be displayed in a reduced manner (folded). Hereinafter, an image obtained by reducing (folding, reducing a lateral width of) the normal navigation image 6 is referred to as the reduced navigation image 7.

When not performing reduction display of the navigation image 5, the panel control unit 10 controls the display panel 11 to display the normal navigation image 6. The normal navigation image 6 includes the category selection keys K5. As shown in an upper illustration in FIG. 7 and a lower illustration in FIG. 8, the normal navigation image 6 includes the plurality of category selection keys K5 and one folding key K6. The folding key K6 is a key for reducing the normal navigation image 6 to the reduced navigation image 7. The normal navigation image 6 is an image in which the folding key K6 and the plurality of category selection keys 5 are arranged (combined) in the up-down direction. The folding key K6 is disposed in a lowermost tier in the normal navigation image 6. The plurality of category selection keys K5 are arranged above the folding key K6. The folding key K6 has a lateral width equal to that of the category selection keys K5. In the normal navigation image 6, the folding key K6 and the category selection keys K5 are positionally aligned on both left and right ends thereof. As thus described, the normal navigation image 6 is a rectangular block image. The category selection keys K5 and the folding key K6 are included in this block image.

One example of the reduced navigation image 7 is shown in a lower illustration in FIG. 7 and an upper illustration in FIG. 8. The reduced navigation image 7 is an image displayed in the second region F2 while reduction display is performed. The reduced navigation image 7 is an image obtained by omitting some contents of the normal navigation image 6. That is, the reduced navigation image 7 is an image whose display area is reduced compared with that of the normal navigation image 6. The reduced navigation image 7 includes an expansion key K8. The expansion key K8 is a key for unfolding (restoring) the reduced navigation image 7 to the normal navigation image 6.

The reduced navigation image 7 also is a rectangular image. The reduced navigation image 7 is an image in which a plurality of keys are arranged in combination in the up-down direction. The reduced navigation image 7 includes one expansion key K8 and a plurality of reduced category selection keys K7. When performing reduction display, the panel control unit 10 controls the display panel 11 to display the reduced navigation image 7 including the reduced category selection keys K7. The reduced category selection keys K7 have a lateral width equal to that of the expansion key K8. The expansion key K8 is disposed in a lowermost tier in the reduced navigation image 7. The plurality of reduced category selection keys K7 are arranged above the expansion key 8. In the reduced navigation image 7, the keys included therein are positionally aligned on both left and right ends thereof. The reduced navigation image 7 is a rectangular block image. The reduced category selection keys K7 and the expansion key K8 are included in this block image.

In the reduced navigation image 7, the panel control unit 10 performs control so that the category selection keys K5 are replaced with the reduced category selection keys K7. The reduced category selection keys K7 are smaller in size than the category selection keys K5. Furthermore, the panel control unit 10 performs control so that the folding key K6 is replaced with the expansion key K8. The expansion key K8 is smaller in size than the folding key K6. As a result, the reduced navigation image 7 is smaller in size than the normal navigation image 6.

Specifically, when not performing reduction display (when the normal navigation image 6 is displayed), the panel control unit 10 controls the display panel 11 to display the category selection keys K5. In each of the category selection keys K5, an icon image and a category title are arranged in a lateral direction. When reduction display is performed, the display panel 11 is controlled to display the reduced category selection keys K7. The reduced category selection keys K7 are keys whose width in the left-right direction is made narrower than that of the category selection keys K5 by omitting the category titles. The reduced category selection keys K7 have a lateral width narrower than that of the category selection keys K5. The expansion key K8 has a lateral width narrower than that of the folding key K6. Meanwhile, the folding key K6, each of the category selection keys K5, the expansion key K8, and each of the reduced category selection keys K7 are equal in size in the up-down direction. Furthermore, these keys are positionally aligned on left ends thereof. As a result, when the normal navigation image 6 is reduced to the reduced navigation image 7, the normal navigation image 6 appears to have been folded (retracted).

A selection of a category can be made by operating either any of the category selection keys K5 or a corresponding one of the reduced category selection keys K7. Based on an output of the touch panel 12, the panel control unit 10 recognizes that any of the category selection keys K5 or a corresponding one of the reduced category selection keys K7 has been operated. Upon recognizes a selection of a category made through such a key operation, the panel control unit 10 performs control so that a set of item selection keys K2 belonging to the category selected through the operation are displayed in the first region F1.

By operating the folding key K6, a user can reduce the normal navigation image 6 to the reduced navigation image 7 (reduction display). Furthermore, while the reduction display is performed, upon recognizing, based on an output of the touch panel 12, that the expansion key K8 has been operated, the panel control unit 10 controls the display panel 11 to redisplay the normal navigation image 6. In this case, the panel control unit 10 performs control so that the category selection keys K5 are displayed in place of the reduced category selection keys K7. Furthermore, the panel control unit 10 controls the display panel 11 to display the folding key K6 in place of the expansion key K8.

Furthermore, it is possible to make a setting to automatically reduce the normal navigation image 6 to the reduced navigation image 7. This setting can be made on a reduction display setting screen S4. When a prescribed operation for displaying the reduction display setting screen S4 has been performed, the panel control unit 10 controls the display panel 11 to display the reduction display setting screen S4.

On the reduction display setting screen S4, there are disposed a first reduction execution key K9, a first reduction non-execution key K10, a second reduction execution key K11, a second reduction non-execution key K12, a plus key K13, and a minus key K14.

On the operation panel 1, when starting to display the item selection screen S2, the panel control unit 10 controls the display panel 11 to display the normal navigation image 6 in the second region F2. When wishing to perform automatic reduction (width reduction) to the reduced navigation image 7, a user operates the first reduction execution key K9. In a case where the first reduction execution key K9 has been operated, when a preset wait time has elapsed since the start of displaying the normal navigation image 6, the panel control unit 10 performs control so that the reduced navigation image 7 is displayed in place of the normal navigation image 6. That is, in a case where a setting has been made beforehand to perform automatic reduction display, when the wait time has elapsed since an initial start of displaying the normal navigation image 6 (from when the start condition is met), the panel control unit 10 controls the display panel 11 to perform reduction display.

When not performing automatic reduction (width reduction) to the reduced navigation image 7, the user operates the first reduction non-execution key K10. In a case where the first reduction non-execution key K10 has been operated, the panel control unit 10 controls the display panel 11 not to perform switching to the reduced navigation image 7 at all. That is, in a case where the first reduction non-execution key K10 has been operated, the panel control unit 10 performs control so that the normal navigation image 6 is continuously displayed even when the wait time has elapsed since the start of displaying the normal navigation image 6 (from when the start condition is met).

Furthermore, on the reduction display setting screen S4, it is possible to make a setting as to whether or not to automatically reduce the normal navigation image 6 redisplayed. Herein, redisplaying means that, after the normal navigation image 6 has been automatically changed to the reduced navigation image 7, the user operates the expansion key K8 so that the normal navigation image 6 is displayed.

When wishing to perform automatic reduction of the normal navigation image 6 redisplayed (resulting from operating the expansion key K8), the user operates the second reduction execution key K11. In a case where the second reduction execution key K11 has been operated, when the wait time has elapsed since the start of redisplaying the normal navigation image 6 (from when the expansion key K8 is operated), the panel control unit 10 controls the display panel 11 to perform switching to the reduced navigation image 7. That is, in a case where a setting has been made beforehand to perform automatic reduction display after the start of redisplaying, when the wait time has elapsed since when the normal navigation image 6 is redisplayed, the panel control unit 10 controls the display panel 11 to perform reduction display.

When not performing automatic reduction of the normal navigation image 6 redisplayed, the user operates the second reduction non-execution key K12. In a case where the second reduction non-execution key K12 has been operated, the panel control unit 10 controls the display panel 11 not to perform switching to the reduced navigation image 7 even when the wait time has elapsed since the start of redisplaying the normal navigation image 6 (from when the expansion key K8 is operated). That is, in a case where a setting has been made beforehand not to perform automatic reduction display after the start of redisplaying, the panel control unit 10 controls the display panel 11 not to perform reduction display even when the wait time has elapsed since when the normal navigation image 6 is redisplayed. The panel control unit 10 controls the display panel 11 to continue displaying the normal navigation image 6 redisplayed.

Furthermore, on the reduction display setting screen S4, the touch panel 12 accepts a setting of a length of the wait time. The panel control unit 10 handles a length of time thus set as the wait time. The length of time can be set by using the plus key K13 and the minus key K14. When wishing to increase the length of the wait time, the user operates the plus key K13. When wishing to decrease the length of the wait time, the user operates the minus key K14. It is also possible to display only the reduced navigation image 7 and not to display the normal navigation image 6 by setting the length of the wait time to zero.

Operating an end key K15 completes setting performed on the reduction display setting screen S4. Contents of a setting (data indicating operated keys and a set length of the wait time) made on the reduction display setting screen S4 are stored in the ROM 23, the storage 25, or a non-volatile memory in the operation panel 1.

(Display of Setting Information i1 while in Reduction Display)

Next, with reference to FIG. 7 and FIG. 8, a description is given of one example of displaying setting information i1 while reduction display is performed on the operation panel 1 according to the embodiment. As a result of performing reduction display, an empty space is generated in the second region F2. When reduction display is started, the panel control unit 10 performs control so that the setting information i1 is displayed in the space generated as a result of the reduction display.

One example of the setting information i1 is displayed in the lower illustration in FIG. 7 and the upper illustration in FIG. 8. While reduction display is performed, the panel control unit 10 controls the display panel 11 to display the setting information i1 in a third region F3. The third region F3 is a region provided in the second region F2. The third region F3 is a region in which, prior to the reduction display, the normal navigation image 6 had been displayed. The third region F3 is a region emptied as a result of the reduction display. The setting information i1 indicates set values presently set. In FIG. 7 and FIG. 8, the setting information i1 is enclosed in a rectangle. The rectangle contains character strings indicating the present set values.

The panel control unit 10 controls the display panel 11 to display, as the setting information i1, set values changed from their default set values (initial set values) through an operation performed by a user. In a case where no change has been made from the default set values, the panel control unit 10 may control the display panel 11 to display a message saying that no change has been made from the default set values. Or alternatively, the panel control unit 10 may perform control so that default set values of the items included in the category of "basic setting" are displayed as the setting information i1.

As shown in the lower illustration in FIG. 8, when the normal navigation image 6 is redisplayed by operating the expansion key K8, the third region F3 disappears. It is conceivable that some users may feel frustrated by disappearance of information that has once been displayed. To avoid this situation, when the normal navigation image 6 is redisplayed after the start of displaying the setting information i1 in the third region F3, the panel control unit 10 performs control so that the setting information i1 is displayed in the first region F1. The setting information i1 is displayed in the first region F1 instead of the third region F3.

When displaying the setting information i1 in the first region F1, the panel control unit 10 controls the display panel 11 to display the setting information i1 in the form of a transparent image. Thus, even when the setting information i1 is displayed in the first region F1, viewability of the item selection keys K2 therein is prevented from being impaired. In this case, for example, a transmittance of 30% to 70%, more preferably, about 50% can be adopted.

Furthermore, the setting information i1 as displayed in the first region F1 can be moved by performing an operation with respect to the touch panel 12. It can be appropriately determined what type of operation is handled as an operation of moving the setting information i1. For example, in response to a drag operation, the panel control unit 10 performs control so as to move a display position of the setting information i1 as displayed in the first region F1. The drag operation is an operation of moving a touched position of the setting information i1 with a touch on the display position thereof maintained.

Moreover, there is a case where the folding key K6 is operated or automatic reduction display is performed in a state where the setting information i1 is displayed in the first region F1. When the normal navigation image 6 is switched to the reduced navigation image 7 in this manner, the panel control unit 10 performs control so that the setting information i1 as displayed in the first region F1 disappears. Then, the panel control unit 10 performs control so that the setting information it is displayed in the third region F3 that has appeared again (a return is made from a state shown in the lower illustration in FIG. 8 to a state shown in the upper illustration in FIG. 8).

As thus described, the display input device (the operation panel 1) according to the embodiment includes the display panel 11, the touch panel 12, and the panel control unit 10. The display panel 11 performs display. The touch panel 12 is provided with respect to the display panel 11 and accepts an operation performed by a user. When a preset start condition is met, the panel control unit 10 controls the display panel 11 to start displaying the item selection screen S2 that is a screen including the first region F1 and the second region F2. The panel control unit 10 performs control so that the item selection keys K2 for selecting an item are displayed in the first region F1. When starting to display the item selection screen S2, the panel control unit 10 performs control so that the normal navigation image 6 for selecting a category of the item is displayed in the second region F2. When a preset wait time has elapsed since the start of displaying the normal navigation image 6, the panel control unit 10 controls the display panel 11 to perform reduction display in which the reduced navigation image 7 is displayed in place of the normal navigation image 6. The reduced navigation image 7 is an image that includes the expansion key K8 and is obtained by omitting some contents of the normal navigation image 6 so as to reduce a display area of the reduced navigation image 7. While the reduction display is performed, upon recognizing, based on an output of the touch panel 12, that the expansion key K8 has been operated, the panel control unit 10 controls the display panel 11 to redisplay the normal navigation image 6 in the second region F2. The panel control unit 10 controls the display panel 11 not to perform reduction display even when the wait time has elapsed since the start of redisplaying the normal navigation image 6. The panel control unit 10 controls the display panel 11 to continue displaying the normal navigation image 6.

Thus, the navigation image 5 displayed in an expanded manner based on a user's intention and operation of largely displaying it (redisplaying a full version thereof) can be kept displayed in an expanded state. Even when a given length of time has elapsed, the normal navigation image 6 is not reduced and can be kept displayed. This enables display respecting a user's intention of wishing to perform redisplaying. Furthermore, this prevents user's unintended (unexpected) display from being performed.

Furthermore, when not performing reduction display, the panel control unit 10 controls the display panel 11 to display the normal navigation image 6 including the category selection keys K5 having a normal size. When performing reduction display, the panel control unit 10 performs control so that the category selection keys K5 are replaced with the reduced category selection keys K7 that are smaller in size than the category selection keys K5. Accordingly, the panel control unit 10 controls the display panel 11 to display the reduced navigation image 7 smaller in size than the normal navigation image 6. Upon recognizing, based on an output of the touch panel 12, a selection of a category made through an operation with respect to any of the category selection keys K5 or a corresponding one of the reduced category selection keys K7, the panel control unit 10 controls the display panel 11 to display, in the first region F1, a set of item selection keys K2 belonging to the category selected through the operation. The normal navigation image 6 (global navigation) can thus be displayed in the second region F2. The normal navigation image 6 provides guidance so that desired ones of the item selection keys K2 are displayed in the first region F1. Furthermore, the normal navigation image 6 can be folded into a compact size, i.e. reduced to the reduced navigation image 7. This enables effective utilization of a region within a screen. Moreover, by operating an image included in each type of navigation, one of the item selection keys K2 corresponding to an item desired to be set can be displayed in the first region F1.

Furthermore, when not performing reduction display, the panel control unit 10 controls the display panel 11 to display the category selection keys K5 in each of which an icon image indicating a category type and a corresponding category title are arranged in the lateral direction. When performing reduction display, the panel control unit 10 controls the display panel 11 to display the reduced category selection keys K7 whose width in the left-right direction is made narrower than that of the category selection keys K5 by omitting the category titles. Thus, the reduced navigation image 7 can be made shorter in width than the normal navigation image 6. Furthermore, an image obtained by folding the normal navigation image 6 can be used as the reduced navigation image 7. The reduced navigation image 7 can be made much smaller in size than the normal navigation image 6. Furthermore, all the images for selecting a category are set not to disappear. The icon images are left displayed as the reduced navigation image 7 so that a selection of a category can be made. Thus, based on the icon images, a user can select a desired category.

Furthermore, in a case where a setting has been made beforehand to perform automatic reduction display when the wait time has elapsed since the start of displaying the item selection screen S2, when the wait time has elapsed since the start of displaying the item selection screen S2, the panel control unit 10 controls the display panel 11 to perform reduction display. In a case where a setting has been made beforehand not to perform automatic reduction display when the wait time has elapsed since the start of displaying the item selection screen S2, the panel control unit 10 controls the display panel 11 to continue displaying the normal navigation image 6 even when the wait time has elapsed since the start of displaying the item selection screen S2. Thus, it is possible to make a setting as to whether or not to automatically perform reduction display when the wait time has elapsed since an initial start of displaying the normal navigation image 6. A user wishing to keep the normal navigation image 6 displayed could make a setting not to perform automatic reduction display. Furthermore, a user wishing to perform reduction display could make a setting to perform automatic reduction display. It is, therefore, possible to perform display fulfilling a user's requirements.

Furthermore, in a case where a setting has been made beforehand to perform automatic reduction display when the wait time has elapsed since the start of redisplaying the normal navigation image 6, when the wait time has elapsed since when the normal navigation image 6 is redisplayed, the panel control unit 10 controls the display panel 11 to perform reduction display. In a case where a setting has been made beforehand not to perform automatic reduction display when the wait time has elapsed since the start of redisplaying the normal navigation image 6, the panel control unit 10 controls the display panel 11 not to perform reduction display even when the wait time has elapsed since when the normal navigation image 6 is redisplayed. The panel control unit 10 controls the display panel 11 to continue displaying the normal navigation image 6 redisplayed.

Thus, it is possible to make a setting as to whether or not to perform reduction display after the normal navigation image 6 has been displayed 6. In other words, it is possible to make a setting as to whether or not to perform automatic reduction of the normal navigation image 6 redisplayed. Accordingly, it is possible to perform display fulfilling a user's requirements.

Furthermore, while reduction display is performed, the panel control unit 10 controls the display panel 11 to display, in the third region F3, the setting information i1 indicating set values presently set. The third region F3 is a region in which, prior to the reduction display, the normal navigation image 6 had been displayed and a region emptied as a result of the reduction display. Thus, information useful for setting can be displayed in a space generated (emptied) as a result of reduction display.

Furthermore, when the normal navigation image 6 is redisplayed after the start of displaying the setting information i1, the panel control unit 10 performs control so that the setting information i1 is displayed in the first region F1 instead of the third region F3. Thus, the setting information i1 that has once been displayed can be prevented from disappearing and kept displayed. This prevents a user from being frustrated by disappearance of information once displayed.

Furthermore, when displaying the setting information i1 in the first region F1, the panel control unit 10 controls the display panel 11 to display the setting information i1 in the form of a transparent image. This prevents viewability of images displayed in the first region F1 from being impaired due to the setting information i1.

Furthermore, when reduction display is started in a state where the setting information i1 is displayed in the first region F1, the panel control unit 10 performs control so that the setting information i1 as displayed in the first region F1 disappears. The panel control unit 10 performs control so that the setting information i1 is displayed in the third region F3. Thus, when reduction display is restarted, a display position of the selling information i1 can be moved back in the third region F3 where the setting information i1 is originally displayed. Thus, it is possible to improve viewability of the first region F1. The setting information i1 displayed once can be kept displayed.

The touch panel 12 accepts a setting of a length of the wait time. The panel control unit 10 handles a length of time thus set as the wait time. A user can freely set a length of the wait time.

Furthermore, the multi-functional peripheral 100 (the image forming apparatus) includes the above-mentioned display input device (the operation panel 1) and the printing unit 4 that performs printing based on a setting made on the display input device. Since the display input device respecting a user's intention is included, there can be provided an image forming apparatus that achieves ease of use and ease of setting.

While the foregoing has described the embodiment of the present invention, the scope of the present invention is not limited thereto. The present invention can be implemented by adding various modifications thereto without departing from the spirit of the invention.

INDUSTRIAL APPLICABILITY

The present invention is usable in a display input device such as an operation panel and in an image forming apparatus including the display input device.

The invention claimed is:
1. A display input device, comprising:
a display panel;
a touch panel that is provided with respect to the display panel and accepts an operation performed by a user; and
a panel control unit,
wherein
when the panel control unit starts displaying an item selection screen that is a screen including a first region and a second region,
the panel control unit performs control so that an item selection key for selecting an item is displayed in the first region, and
so that a normal navigation image for selecting a category of the item is displayed in the second region,
when a preset wait time has elapsed since a start of displaying the normal navigation image, the panel control unit controls the display panel to perform reduction display in which, in place of the normal navigation image, a reduced navigation image is displayed that is obtained by omitting some contents of the normal navigation image so as to reduce a display area of the reduced navigation image, the reduced navigation image including an expansion key,
while the reduction display is performed, upon recognizing, based on an output of the touch panel, that the expansion key has been operated, the panel control unit controls the display panel to redisplay the normal navigation image in the second region,
the panel control unit controls the display panel not to perform the reduction display even when the wait time has elapsed since a start of redisplaying the normal navigation image, and controls the display panel to continue displaying the normal navigation image,
when not performing the reduction display, the panel control unit controls the display panel to display the normal navigation image including a category selection key having a normal size,
when performing the reduction display, the panel control unit performs control so that the category selection key is replaced with a reduced category selection key that is smaller in size than the category selection key, thus controlling the display panel to display the reduced navigation image that is made smaller in size than the normal navigation image, and
upon recoqnizinq, based on an output of the touch panel, a selection of a category made through an operation with respect to the category selection key or the reduced category selection key, the panel control unit controls the display panel to display, in the first region, as the item selection key, a key belonging to the category selected through the operation, and
while the reduction display is performed, the panel control unit controls the display panel to display, in a third region, setting information indicating a set value presently set, the third reqion beinq a region in which, provided in the second reqion, prior to the reduction display, the normal navigation image had been displayed and a region emptied as a result of the reduction display.
2. The display input device according to claim 1, wherein
when not performing the reduction display, the panel control unit controls the display panel to display the category selection key in which an icon image indicating a category type and a corresponding category title are arranged in a lateral direction, and when performing the reduction display, the panel control unit controls the display panel to display the reduced category selection key whose width in a left-right direction is made narrower than that of the category selection key by omitting the category title.

3. The display input device according to claim 1, wherein in a case where a setting has been made beforehand to automatically perform the reduction display when the wait time has elapsed since a start of displaying the item selection screen, when the wait time has elapsed since the start of displaying the item selection screen, the panel control unit controls the display panel to perform the reduction display, and in a case where a setting has been made beforehand not to automatically perform the reduction display when the wait time has elapsed since the start of displaying the item selection screen, the panel control unit controls the display panel to continue displaying the normal navigation image even when the wait time has elapsed since the start of displaying the item selection screen.

4. The display input device according to claims 1, wherein in a case where a setting has been made beforehand to automatically perform the reduction display when the wait time has elapsed since the start of redisplaying the normal navigation image, when the wait time has elapsed since when the normal navigation image is redisplayed, the panel control unit controls the display panel to perform the reduction display, and in a case where a setting has been made beforehand not to automatically perform the reduction display when the wait time has elapsed since the start of redisplaying the normal navigation image, the panel control unit controls the display panel not to perform the reduction display even when the wait time has elapsed since when the normal navigation image is redisplayed, and controls the display panel to continue displaying the normal navigation image redisplayed.

5. The display input device according to claim 1, wherein when the normal navigation image is redisplayed after a start of displaying the setting information, the panel control unit performs control so that the setting information is displayed in the first region instead of the third region.

6. The display input device according to claim 5, wherein when displaying the setting information in the first region, the panel control unit controls the display panel to display the setting information in a form of a transparent image.

7. The display input device according to claim 5, wherein when the reduction display is started in a state where the setting information is displayed in the first region, the panel control unit performs control so that the setting information as displayed in the first region disappears and so that the setting information is displayed in the third region.

8. The display input device according to claim 1, wherein the touch panel accepts a setting of a length of the wait time, and the panel control unit handles the length thus set as the wait time.

9. An image forming apparatus, comprising:

the display input device according to claim 1; and a printing unit that performs printing based on a setting made on the display input device.

10. A method for controlling a display input device, the method comprising steps of:

when starting displaying an item selection screen that is a screen including a first region and a second region, displaying an item selection key for selecting an item in the first region and displaying a normal navigation image for selection a category of the item in the second region;

performing, when a preset wait time has elapsed since a start of displaying the normal navigation image, reduction display in which, in place of the normal navigation image, a reduced navigation image is displayed that is obtained by omitting some contents of the normal navigation image so as to reduce a display area of the reduced navigation image, the reduced navigation image including an expansion key;

redisplaying, when the expansion key is operated while the reduction display is performed, the normal navigation image in the second region;

not performing the reduction display even when the wait time has elapsed since a start of redisplaying the normal navigation image, and controlling the display panel to continue displaying the normal navigation image;

when not performing the reduction display, displaying the normal navigation image including a category selection key having a normal size, when performing the reduction display, replacing the category selection key with a reduced category selection key that is smaller in size than the category selection key, thus displaying the reduced navigation image that is made smaller in size than the normal navigation image, and upon recognizing, based on an output of the touch panel, a selection of a category made through an operation with respect to the category selection key or the reduced category selection key, displaying, in the first region, as the item selection key, a key belonging to the category selected through the operation, and while the reduction display is performed, displaying, in a third region, setting information indicating a set value presently set, the third region being a region in which, provided in the second region, prior to the reduction display, the normal navigation image had been displayed and a region emptied as a result of the reduction display.

* * * * *